US010367793B2

(12) United States Patent
Landais (10) Patent No.: US 10,367,793 B2
(45) Date of Patent: Jul. 30, 2019

(54) SECURE DATA EXCHANGE METHOD BETWEEN A COMMUNICATION DEVICE AND A SERVICE PROVIDER BASED ON ASYMMETRIC PUBLIC KEY HANDLING AND ENCRYPTION USING HARDWARE KEY, AND COMMUNICATION DEVICE AND SYSTEM IMPLEMENTING THE SAME (75) Inventor: Thomas Landais, Rueil Malmaison (FR)

(73) Assignee: SAGEMCOM BROADBAND SAS, Rueil Malmaison (FR)

( * ) Notice: Subject to any disclaimer, the term of this patent is extended or adjusted under 35 U.S.C. 154(b) by 44 days.

(21) Appl. No.: 14/344,317

(22) PCT Filed: Sep. 12, 2012

(86) PCT No.: PCT/EP2012/067847
§ 371 (c)(1),
(2), (4) Date: Dec. 1, 2014

(87) PCT Pub. No.: WO2013/037828
PCT Pub. Date: Mar. 21, 2013

(65) Prior Publication Data
US 2015/0082018 A1     Mar. 19, 2015

(30) Foreign Application Priority Data
Sep. 13, 2011  (FR) .................................. 11 58132

(51) Int. Cl.
*H04L 29/06* (2006.01)
*H04L 9/08* (2006.01)

(52) U.S. Cl.
CPC ........ *H04L 63/0442* (2013.01); *H04L 9/0833* (2013.01); *H04L 9/0836* (2013.01);
(Continued)

(58) Field of Classification Search
CPC . H04L 9/0833; H04L 9/0836; H04L 2209/60; H04L 63/0442; H04L 63/061; H04L 2463/062
(Continued)

(56) References Cited

U.S. PATENT DOCUMENTS 5,559,889 A *  9/1996  Easter .................... G06F 21/72
                                                    380/30
6,259,791 B1 *  7/2001  Moore .................. H04W 8/245
                                                    380/271
(Continued)

FOREIGN PATENT DOCUMENTS

| EP | 1 278 330 A1 | 1/2003 |
| WO | WO 02/19609 A2 | 3/2002 |
| WO | WO 02/39660 A2 | 5/2002 |

*Primary Examiner* — Farid Homayounmehr
*Assistant Examiner* — Sanchit K Sarker
(74) *Attorney, Agent, or Firm* — Pillsbury Winthrop Shaw Pittman LLP (57) ABSTRACT The invention relates to a method for securely exchanging data (5) between a communication device (1) and a server (8) of a service provider (2) via a communication network (3), the communication device (1) enabling at least one user (13) of the communication device (1) to use the services (4) provided by said service provider (2), said method being characterized in that it includes the following steps for exchanging data (5) between the communication device (1) and at least one server (8) of the service provider (2): in order to send the data (5), encrypting at least a portion of the sent data (5) using a physical key (7) which is known to the service provider (2) and which is physically written in a read-only memory of an electronic chip (6) of the communication device (1); and, upon receiving the data (5), decrypting the received data using said physical key (7).

20 Claims, 4 Drawing Sheets (52) U.S. Cl.
CPC ........ *H04L 63/061* (2013.01); *H04L 2209/60* (2013.01); *H04L 2463/062* (2013.01)

(58) Field of Classification Search
USPC .......................................................... 713/150
See application file for complete search history.

(56) References Cited

U.S. PATENT DOCUMENTS

| | | | | |
|---|---|---|---|---|
| 7,149,308 B1* | 12/2006 | Fruehauf | ............... | G06F 21/602 380/44 |
| 7,234,059 B1* | 6/2007 | Beaver | ................. | H04L 9/0833 380/283 |
| 7,315,950 B1* | 1/2008 | Baransky | ................ | G06F 21/10 713/193 |
| 8,347,100 B1* | 1/2013 | Thornewell | .......... | H04L 9/3247 713/176 |
| 8,954,740 B1* | 2/2015 | Moscaritolo | .......... | H04L 63/065 380/277 |
| 2002/0146129 A1* | 10/2002 | Kaplan | ............... | G06F 21/6227 380/270 |
| 2003/0185399 A1* | 10/2003 | Ishiguro | ........... | G11B 20/00086 380/281 |
| 2005/0287990 A1* | 12/2005 | Mononen | .............. | G06F 21/335 455/411 |
| 2007/0266416 A1* | 11/2007 | Cheng | .............. | H04N 21/25875 725/115 |
| 2008/0046718 A1* | 2/2008 | Grab | ....................... | G06F 21/10 713/156 |
| 2009/0190762 A1* | 7/2009 | Dellow | ................. | H04L 9/0891 380/277 |
| 2012/0203701 A1* | 8/2012 | Ayuso de Paul | ..... | H04L 63/061 705/71 |
| 2015/0082018 A1* | 3/2015 | Landais | ................ | H04L 9/0833 713/150 |

* cited by examiner

SECURE DATA EXCHANGE METHOD BETWEEN A COMMUNICATION DEVICE AND A SERVICE PROVIDER BASED ON ASYMMETRIC PUBLIC KEY HANDLING AND ENCRYPTION USING HARDWARE KEY, AND COMMUNICATION DEVICE AND SYSTEM IMPLEMENTING THE SAME

FIELD OF THE INVENTION

The invention relates to a method for securely exchanging data between a communication device and a service provider via a communications network, as well as to the creation and management of user communities.

STATE OF THE ART

It is known that users access services, for examples games, videos, or sharing of information, proposed by service providers. The service providers are generally specialized providers or telecommunication operators proposing to their subscribers specific contents or services.

For this purpose, the users have a communication device, such as for example a digital decoder, which allows them to access the services proposed by the service providers, via a communications network, notably of the Internet type.

Generally, a same communication device is used by several users, such as for example in the case of a family comprising several persons.

The exchanges between the communication device and the service provider should be secured, in order to avoid third party accessing private information of the user. For this purpose, secure procedures for data exchange exist, such as the SSL (Secure Socket Layer) and HTTPS (Hypertext Transfer Protocol Secure) certificates.

However, the secured exchange method of the state of the art may be diverted by third parties, which may for example propose false SSL certificates to the users.

In particular, these exchanges are sensitive to attacks from so-called men-in-the-middle, which relates to a third party successfully intercepting communications between the communication device and the service provider, notably by pretending to be a relay or a router.

Moreover, as emphasized earlier, the same communication device is most often used by a plurality of users. The service provider wishes to be able to distinguish the users of a same communication device, in order to provide adapted and customized services.

Also, each user wishes to be able to use services, such as for example social networks or email accounts, without the other users having access to his/her data.

Finally, the service provider wishes to be able to give the possibility to each user of creating or connecting to communities of users, in order to promote exchanges and to diversify the services proposed to the users.

However, to this day, there does not exist any solution for meeting these needs, notably in terms of security, ease of use and efficiency.

PRESENTATION OF THE INVENTION

In an embodiment, a method is proposed for securely exchanging data between a communication device and a server of a service provider via a communications network, said method being characterized in that exchanged data between the communication device and at least one server of the service provider allow creation and access to communities grouping a plurality of users and specific services, characterized in that the data exchange steps consist of:
  associating an asymmetrical public key of one or several users to at least one community requested by the latter, each user from a plurality of users of a communication device each having an asymmetrical public key which is specific to him/her,
  allowing the users to access the services of the community, and/or to exchange with the other users of the community, by recognition of the public key of each user, and
  securing the data exchangers between the users and the community, and/or between the users of a same community, by encrypting at least one portion of the sent data, via a hardware key, known to the service provider, and materially written in a read-only memory of an electronic chip of the communication device of each user, and by decrypting, during the receiving of data, received data via this hardware key.

In an embodiment, the exchanged data comprise at least one of the following pieces of information:
  a unique identifier specific to the communication device, allowing the server of the service provider to identify the communication device, the server of the service provider using this identifier for finding the hardware key associated with the communication device,
  a service identifier, specific to each service requested by the user via the communication device, allowing the service provider server to identify the service requested by the user via the communication device,
  a piece of information relative to an index used for selecting a key transmitted over the communications network,
  a secured communication protocol between the communication device and the server of the service provider.

In an embodiment, the data exchanged between the communication device and the service provider server comprise at least one first level key, itself encrypted with at least one key of a second level, this successive encryption being achieved down to a key of level n, with n being an integer greater than or equal to two, the first level key being encrypted with the hardware key.

In an embodiment, each user registers at the communication device, and is assigned an asymmetrical public key which is specific to him/her, as well as an asymmetrical private key which is specific to him/her. The data exchanged between the communication device and the server of the service provider comprise the asymmetrical public key specific to the user, said asymmetrical public key being encrypted or non-encrypted with the hardware key, the asymmetrical public key allows identification of the user, and/or of the services of the service provider associated with this user.

In an embodiment, a user may request access to a public community managed by the access provider. This access is achieved via the association by the server of the service provider of the asymmetrical public key of the user with the public community. Also, a user may request access to a private community, managed by another user. This access is achieved, after consent from the other user, via the association by the server of the service provider of the asymmetrical public key of the user with the private community.

In an embodiment, the exchange of data between the server of the service provider and the user-members of a same community comprises a step according to which a multi-user key, common to at least one portion of the users of the community, is used for encrypting the exchanged data.

In particular, according to an aspect, the sending of data from the server of the service provider to user members of a same community, said data being identical for the users, comprises the step according to which the server of the service provider sends only once these data, encrypted with the multi-user key, to the communications network which sends them back to each user-member of the same community.

In an embodiment, the server of the service provider sends an encryption key to at least two communication devices of users wishing to exchange data between them, and the communication devices exchange data directly between them via the communications network, without the data passing in transit through the server of the service provider, said data being encrypted with the encryption key.

The exchanges between the communication device and the service provider benefit from increased security. In particular, the attacks from third parties consisting of interposing themselves between the communication device and the service provider are no longer possible.

This increased security does not alter the interface for using the communication device, which is configured for remaining simple and intuitive for a user.

Further, customization of the services and identification of each user of a same communication device are made possible.

The service provider may propose secured services with high added value. Thus, the creation and management of communities of users, proposing one or several services is made possible in an efficient and secured way. Also, the communications between different users of different communication devices have increased security and improved efficiency.

This securing and this improvement of the quality of the services may be obtained, if necessary, without altering the bandwidth of the service provider.

PRESENTATION OF THE FIGURES

Other features and advantages of the invention will become apparent further from the description which follows, which is purely illustrative and non-limiting, and should be read with reference to the appended drawings wherein.

DETAILED DESCRIPTION

Description of Elements of a Communication System

Figure 1:
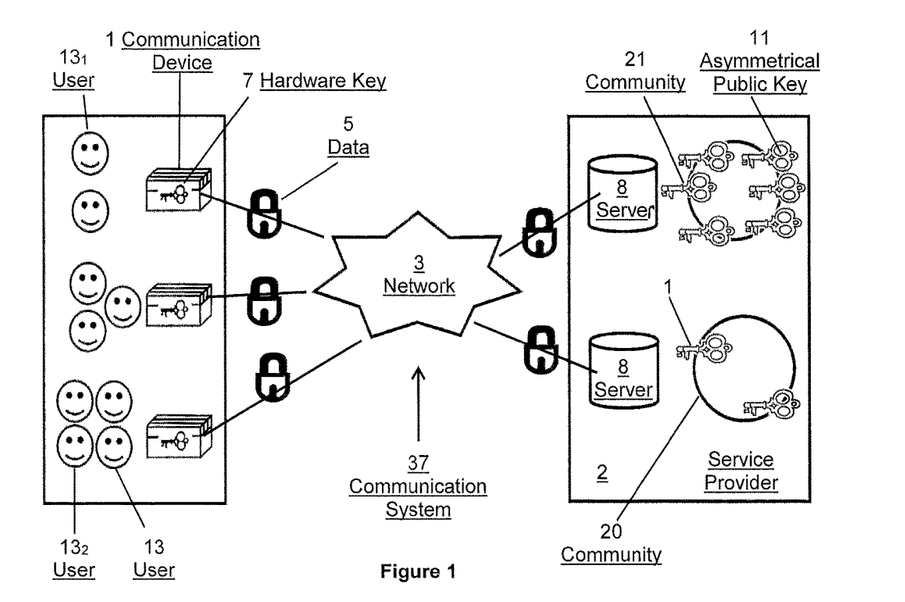
FIG. 1 is a schematic illustration of an embodiment of a communication system comprising a communication device exchanging data with a server of a service provider, via a communications network.

A communication system 37 is illustrated in FIG. 1, configured for securely exchanging data 5 between a communication device 1 and at least one server 8 of a service provider 2, via a communications network 3.

The communications network 3 is for example, but in a non-limiting way, an Internet network, of the IP (Internet Protocol) network type or a telephone network of the 3G type, or a local network.

The service provider 2 is an operator who is capable of providing services to a user. By service is notably meant any contents (music, film, games, Internet access . . . ), or a system for exchanges between users (social networks, video exchanges, email, . . . ) which the service provider 2 may propose to the user via his/her communication device 1.

This is for example a telecommunications operator, to which the user is subscribed in order to be able to access the communications network, the operator further providing inter alia services to his/her subscribers.

Alternatively, this is a service operator dedicated to providing services to users.

The service provider 2 generally comprises at least one server 8 capable of connecting to the communications network 3, for example via physical connections (ADSL, or optical fiber) or antennas (for example in the case of providers 2 of the mobile operator type).

The service provider 2 comprises, if necessary, a plurality of physical connections (cables, optical fibers, etc.), or a series of antennas allowing connection to the communications network 3.

Generally, the service provider 2 comprises several servers.

The servers 8 manage the exchanges of data with the communication devices 1 via the communications network 3. The servers 8 comprise a plurality of processing units or computers, controlled programs, memories, and if necessary a user interface.

The structure of a service provider is standard, and mainly depends on the type of connection to the communications network (e.g: ADSL, 3G operator or of other standards of this type—1G, 2G, . . . 4G, Wi-Fi, optical fiber, local network, etc.).

Figure 2:
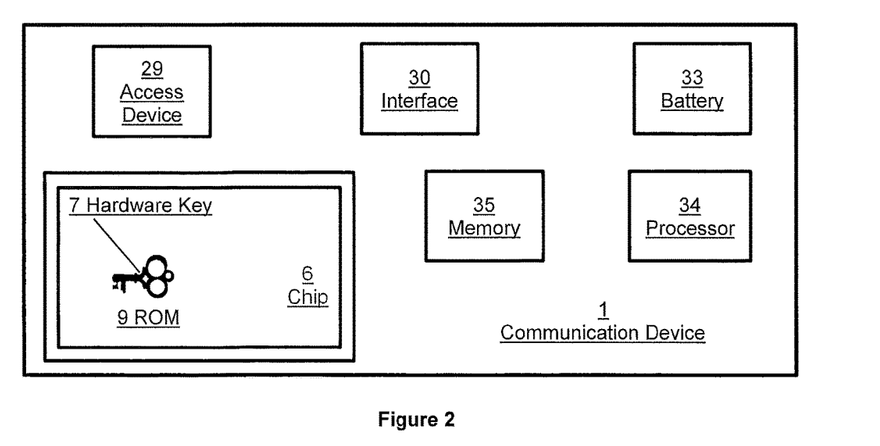
FIG. 2 is a schematic illustration of an embodiment of a communication device.

As schematized in FIG. 2, the communication device 1 comprises means 29 for accessing the communications network 3, for exchanging data, via this network 3, with the server 8 of the service provider 2.

The access means 29 are for example radio transmission and reception means, or Wi-Fi means, or of the antenna type, or wire communication means or any other technical means allowing connection to the communications network 3.

The communication device 1 is localized on the side of the user. For example, the communication device 1 is localized in the home or at the workplace of the user. Alternatively, the communication device 1 is a mobile device which the user may carry with him, such as for example a mobile phone device.

The device 1 further comprises an interface 30, allowing it to interact with a user. The interface 30 is generally a software interface, which displays on a screen connected to the device 1 selections and instructions allowing the user to control the device 1. Alternatively, the device 1 itself comprises a screen, and the interface 30 consists in the aforementioned software interface associated with the screen.

In a standard way, the communication device 1 comprises electric power supply means 33 (battery, mains socket, etc.) and at least one processor 34 managing the different functions of the device 1.

Generally, the communication device 1 also comprises a memory 35, of the hard disc or removable memory type, allowing storage of the received or exchanged data.

As illustrated in FIG. 2, the device 1 comprises a hardware key 7 materially written in a read-only memory 9 of an electronic chip 6 of the communication device 1.

A read-only memory 9 is a memory, the contents of which is materially written once and for all, during the manufacturing of the chip 6 comprising said memory. Thus its content is defined during the manufacturing, and cannot be modified. The hardware key 7 is therefore generated during the manufacturing of the communication device 1.

By electronic chip is meant any electronic assembly which may comprise a read-only memory.

The hardware key 7 is an encryption key, and allows the device 1 to encrypt or decrypt data.

This hardware key 7 is physically written into the read-only memory of the electronic chip 6 of the communication device 1. The hardware key 7 is a more or less complex set of bits, said set of bits being produced via physical components (transistors, etc.) of the read-only memory 9.

The key 7 cannot be consulted from the outside, for example by a software package. Indeed, the read-only memory 9 is embedded into the electronic chip 6, so as to prevent consultation of its content from the outside by a third party.

Thus, only the manufacturer of the chip 6 is aware of this hardware key 7, given that they actually defined and manufactured it.

Upon purchasing by the service provider 2 of the communication device 1, the manufacturer of the chip passes on this hardware key 7 to them so that they may use it as discussed subsequently. Of course, the service provider 2 may themselves manufacture the electronic chip 6.

In a non-limiting embodiment, this is an AES (Advanced Encryption Standard, which is a symmetrical encryption algorithm) key of 128 bits or more (for example 192, 256 bits). Other keys, used in other encryption algorithms, may be used, depending on the security needs (56 bits DES keys (Date Encryption Standard), triple 64 bits DES keys, etc.). These types of keys are not a limitation.

In an embodiment, this hardware key 7 is unique for each device 1.

Secured Exchanges in the Communication System

In an embodiment, a method is proposed for securely exchanging data in the communications system 37, between the communication device 1 and the server 8 of the service provider 2 via the communications network 3, the communication device 1 allowing at least one user 13 of the communication device 1 to use services provided by the service provider 2.

Thus, the exchanges of data 5 between the communication device 1 and the server 8 of the service provider 2, via the communications network 3, comprise, for sending data, the step consisting of encrypting at least one portion of the sent data 5, via the hardware key 7 known to the service provider 2 and materially written into a read-only memory of an electronic chip 6 of the communication device 1.

Thus, on the side of the communication device 1, the latter transmits the data to be sent to the electronic chip 6 comprising the hardware key 7, which sends back the encrypted data. Next, the communication device 1 transmits the encrypted data to the communications network 3 via its means 29 for accessing the communications network 3.

The same applies for the server 8 of the service provider 2, which has the hardware key 7, and may thus encrypt the data by using this key 7, for example via a processor or an electronic chip.

In an embodiment, the service provider 2 possesses a chip comprising this key 7, said key 7 being stored in a read-only memory of said chip.

Alternatively or additionally, the server 8 of the service provider 2 stores a software database containing this key, said key being represented by constitutive bits in said software database.

Given that the hardware key 7 is not exchanged over the communications network 3, and is only known to the service provider 2, the exchanges of data are secured, without any risk of interception by a third party. On the side of the device 1, this key 7 cannot be extracted from read-only memory 9 of the chip 6 and is not even known to the actual user.

The exchanges between the communication device 1 and the server 8 of the service provider 2 are therefore protected.

Upon receiving data 5, the received data are decrypted via this hardware key 7.

On the side of the communication device 1, the latter transmits the data to be decrypted to the chip 6 comprising the hardware key 7 which sends back to it the decrypted data. The same applies on the side of the server 8 of the service provider 2, which uses the hardware key 7 and a processor for decrypting the data.

In an exemplary embodiment, detailed subsequently, the data exchanged between the communication device 1 and the server 8 of the service provider 2 allow creation and access to communities grouping a plurality of users and specific services, the access to a community allowing the use of these services and/or the exchange of data with the other users of the community.

Thus, the creation of these communities and access thereto are secured by means of the secured exchange which has just been described.

Examples of Exchanged Data in the Communications System

Diverse types of data may be exchanged between the communication device 1 and the server 8 of the service provider 2.

In such exchanges, such as for example bank transactions, it is necessary to transmit an encryption key via the communications network 3.

In an embodiment of the invention, a mechanism for successive encryption of keys is used.

Figure 3:
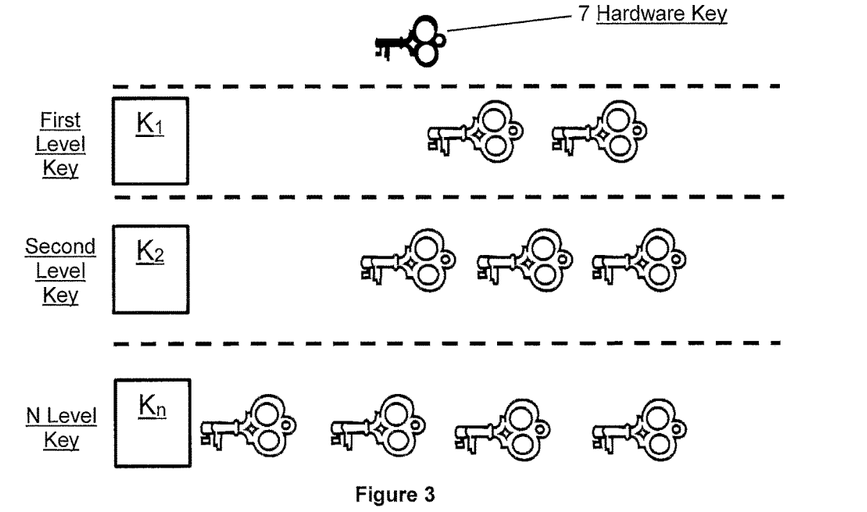
FIG. 3 is a schematic illustration of successive key encryption.

This embodiment is illustrated in FIG. 3.

In this embodiment, the data 5 exchanged between the communication device 1 and the service provider 2 comprise at least one first level key $K_1$, itself encrypted by at least one second level key $K_2$, this successive encryption being achieved down to one or several keys $K_n$ of level n, with n being an integer greater than or equal to two, the first level key $K_1$, being encrypted by the hardware key 7.

The keys $K_1, \ldots K_n$, are software keys, i.e. random sequences of bits, generated by dedicated software packages or algorithms.

The first level key $K_1$ allows decryption of the whole of the keys $K_2$ of level 2, which themselves allow decryption of the whole of the $K_3$ keys of level 3, and so forth.

This successive encryption mechanism reinforces security. Thus, if the server 8 of the service provider 2 decides to transmit over the network a key $K_n$ of level n, a third party would have to find the keys $K_1$ to $K_{n-1}$ in order to be able to obtain the exchanged key $K_n$.

Now, in order to find the key $K_1$, it is necessary to find the hardware key 7, which allows decryption of the key $K_1$. However, as explained before, the hardware key 7 is physically and permanently placed in a chip 6 of the device 1, without any third party being able to access it.

The security of the exchange is therefore guaranteed.

The service provider 2 may select the number of keys corresponding to each level.

In an exemplary embodiment, the service provider 2 sets 64 keys of level 1, each allowing deciphering of 16 keys of level 2, which gives a total of 1024 keys of level 2 (key1, key No. 2, . . . , key No. 1024).

If the service proposed by the service provider 2 to the users of the communication device 1 is a bank application, the server 8 of the service provider 2 may for example control and program the service so that the latter randomly selects one key from the keys No. 1009 to No. 1024.

In an embodiment, the service provider 2 programs the service so that the latter randomly selects a number, a so-called index between 0 and 15. The service provider 2 further programs the service so that each index is associated with a key from among the keys number No. 1009 to No. 1024. The selection of the key is therefore accomplished by random drawing of the index, itself associated with a key. The random drawing and the selection of the indexes are only known to the service provider 2.

Recording and Identification of the Users and of the Communication Device

In an embodiment, the service provider 2 wishes to be able to know the identity of the user of the communication device 1. This has several advantages, such as customization of the services proposed to the user, the follow-up of his/her profile and of his/her consumption, the protection of his/her data relatively to other users, etc.

Figure 4:
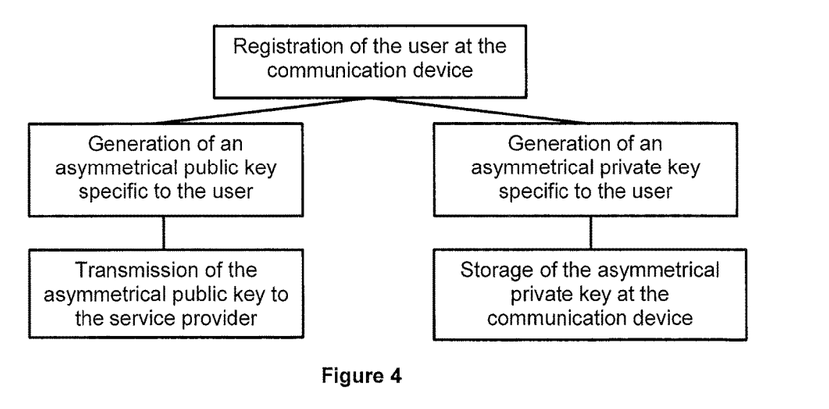
FIG. 4 is a schematic illustration of an embodiment for registration of the user at a communication device.

Thus, according to an embodiment, registration of the user 13 at the communication device 1 is carried out, the result of this registration being passed on to the server 8 of the service provider 2 through the communications network 3.

This is illustrated in FIG. 4, in which a user 13 registers (step 101) at the communication device 1 which generates:
- at least one asymmetrical public key 11 specific to the user 13 (step 104) and transmitted to the server 8 of the service provider 2 (step 105), and
- an asymmetrical private key specific to the user 13 (step 101) and stored in the communication device 1 (step 103).

The communication device 1 decides on the type of key, on the length of the keys, on the duration of validity of the keys, without any intervention from the user. If necessary, the device 1 defines a secret sentence randomly taken from a dictionary of sentences and stored with the private key in a secured area of the communication device 1. This secret sentence is for example used in the process for creating asymmetrical keys and is used as a mnemonic reminder.

The server 8 of the service provider 2 may therefore recognize the user 13 via his/her asymmetrical public key which is specific to him/her.

Indeed, in an embodiment, when a user uses the communication device 1, the data 5 exchanged between the communication device 1 and the server 8 of the service provider comprise the asymmetrical public key specific to the user 13, the asymmetrical public key allowing identification of the user 13, and/or of the services associated with this user 13.

In an embodiment, the asymmetrical public key of the user, transmitted during exchanges of the communication device 1 with the service provider 2 is encrypted by the hardware key 7. This is however not mandatory.

The registration of the user 13 at the communication device 1 is generally carried out via interaction with the interface 30 of the communication device 1.

In an exemplary embodiment, the interface 30 requests from the user the definition of an identifier and of a password, for registering said user. If necessary, the interface 30 requests from the user mandatory information (name, first name, email) and optional information (comments, alias, etc.).

Once these steps have been carried out, the process for generating keys specific to the user is executed.

In order to avoid that a user of a communication device 1 attempts to identify himself/herself fraudulently instead of another user of this device 1, provision is made, in an embodiment, for having the erroneous input of several (for example three) passwords cause blocking of the communication device 1. This blocking may only be removed by the access provider 2.

In an embodiment, the data 5 exchanged between the communication device 1 and the server 8 of the service provider 2 comprise a unique identifier 15 specific to the communication device 1, allowing the server 8 of the service provider 2 to identify the communication device 1.

An advantage of the use of such an identifier 15 is that the server 8 of the service provider 2 may rapidly identify the communication device 1 which sends it data, and may therefore more rapidly select the hardware key 7 corresponding to this communication device 1. The identifier 15 is for example a sequence of figures and/or letters.

In an embodiment, the data 5 exchanged between the communication device 1 and the server 8 of the service provider 2 comprise a service identifier 16, specific to each service requested by the user via the communication device 1, and allowing the service provider 2 to identify the service requested by the user via the communication device 1.

With this identifier 16 it is possible for the server 8 of the service provider 2 to answer the request for access to a service on behalf of the user, with shorter response time.

Also, on the side of the communication device 1, this identifier 16 allows acceleration of the processing of the data.

In an embodiment, the data 5 exchanged between the communication device 1 and the server 8 of the service provider 2 comprise a piece of information relative to an index 17 used for selecting a key transmitted over the communications network 3. This index in one embodiment may be the number of the key.

In another embodiment, the index gives the possibility of indicating in a predefined table, the key actually used for ciphering/deciphering. For example, in the case of a table with N inputs, the access to the key may be given via a predefined calculation and only known to the operator. A calculation example is: index of the key of the table= (predefined number+index), modulo the size N of the table.

Again, this index gives the possibility of more rapidly processing the exchanged data, from the side of the service provider 2 and from the side of the communication device 1.

In an embodiment, the exchanged data comprise a communication protocol 18 secured between the communication device 1 and the service provider 2. This is for example a protocol of the HTPPS (Hypertext Transfer Protocol Secure) or VPN (Virtual Private Network) type.

These different embodiments may be combined or not depending on the choices of the service provider.

Data Frame

In an embodiment, the exchanged data 5 observe a specific frame format.

Figure 5:
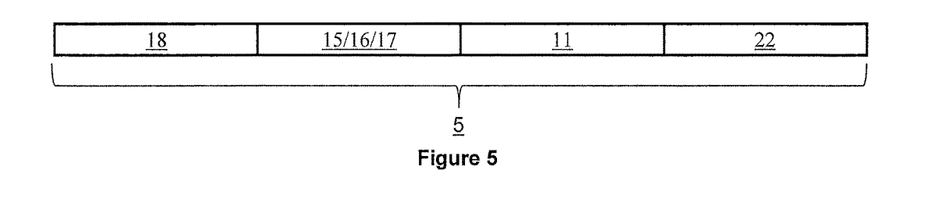
FIG. 5 is a schematic illustration of an embodiment of a format (frame) of data exchanged between a communication device and a server of a service provider.

In FIG. 5, a specific frame type is used for transmitting the data.

The frame comprises the secured communication protocol 18, the unique identifier 15 specific to the communication device 1, the service identifier 16, specific to each service requested by the user via the communication device 1, the information relative to an index 17 used for selecting a key transmitted over the communications network 3. The frame may comprise other pieces of information or only a portion of this information.

The frame further comprises one or several asymmetrical public keys 11 specific to the user, optionally encrypted with the hardware key 7, as mentioned above.

The frame also comprises contents 22, exchanged between the communication device 1 and the service provider 2. These contents are encrypted with the hardware key 7. These contents correspond to useful information related to the services used by the user (text, videos, etc.).

Alternatively, the contents 22 are encrypted via the successive encryption mechanism described earlier. The contents 22 are then successively encrypted with a plurality of encryption keys comprising lastly the hardware key, as described earlier.

By incorporating the data exchanges in a specific frame, the device 1 and/or the server 8 of the service provider 2 may only accept the exchanges which observe this frame, which avoid attacks from third parties consisting of mass sending of data blocks (a technique known under the name of <<arp-spoofing>>), further, this facilitates the processing of the data and accelerates the exchanges.

Creating and Managing Communities of Users

In an embodiment, the exchanges of data 5 between the communication device 1 and the server 8 of the service provider 2 concern the creation, the management of communities, as well as the access to these communities. The different embodiments of data exchanges therefore apply here, as a combination or separately, depending on the needs.

A community groups a plurality of users and of specific services. The access to a community allows the use of the specific services and/or the exchange of data with the other users of the community.

The parameters for creating the community (type of community, number of members, name of the users, access right, certain data, etc.) are stored on the site of the server 8 of the service provider 2.

By means of the different embodiments of exchanges of data described earlier, the creation, the management of communities, as well as the access to these communities are secured.

For example, a community of angling amateurs may be created. Thus, the users, members of this community may exchange between each other photographs or contents related to angling. The users may also converse, with each other, for example on a discussion forum dedicated to angling. Services related to this community therefore include discussion forums, access to fishing competitions, online purchase of equipment, reception of promotional coupons, etc.

The types of service and of exchanges between users may be modulated according to the needs.

In an embodiment, a distinction is made between public communities 21 and private communities 20 (cf. FIG. 1).

A public community 21 is managed by the service provider 2 while a private community 20 is managed by one or several users. In particular, in the case of a public community, it is the service provider 2 via the server 8 who decides whether another user may join the public community or not, while in the case of a private community, it is the responsible user of the private community which makes this decision.

Even if a community is public, the service provider may decide that access to this community is a paying access.

Also, the services proposed in the public communities 21 may be free, not free, or it may be a mixture of paying services and free services.

It is also possible to create communities with an intermediate status, both managed by a user and the service provider, the consent of the user and of the provider being required for authorizing access of another user.

Figure 6:
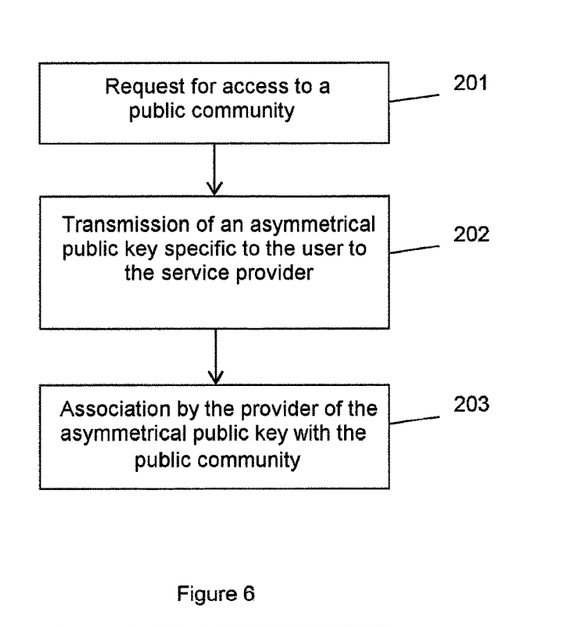
FIG. 6 is a schematic illustration of an embodiment of the access by a user to a public community.

An embodiment of an access request from a user 13 to a public community 21 is described with reference to FIGS. 1 and 6.

A user 13 requests, via the communication device 1, access to a public community 21 proposing at least one service and/or the exchange of data between users of this community (step 201).

This request may be carried out via the interface 30 of the communication device 1, for example by selecting the community 21 in the interface 30.

This public community 21 is managed by the service provider 2, who determines the services associated with this community as well as the access rights of the users.

As described earlier, each user 13 who has registered at the communication device 1 has an asymmetrical public key 11 which is specific to him/her.

Thus, the communication device 1 transmits the asymmetrical public key 11 specific to the user 13 to the server 8 of the service provider 2 (step 202). This key 11 is optionally encrypted with the hardware key 7 of the device 1.

The server 8 of the service provider 2 then associates with the public community 21 requested by the user, the asymmetrical public key 11 of the user (step 203), thus allowing the user to use the service or the services proposed by this community 21.

This association consists of storing in the server 8 a copy of the key 11 of the user and of integrating it into the parameters of the community 21, said parameters being stored in the server 8.

Access to the public community 21 does not require approval from another user.

Subsequently, when the user wishes to access the services of the community, the server 8 of the provider identifies his/her asymmetrical key during exchanges of data, and ascertains that the user has an asymmetrical key associated with the community.

The different exchanges of data with the community are practiced according to one or several of the different embodiments described earlier (encryption with a hardware key, and/or the use of a data frame, etc.)

As an example, this is a community 21 which relates to hiking amateurs. The services of this community are for example the supply of hiking maps, establishing relationships between hiking amateurs, etc.

Figure 7:
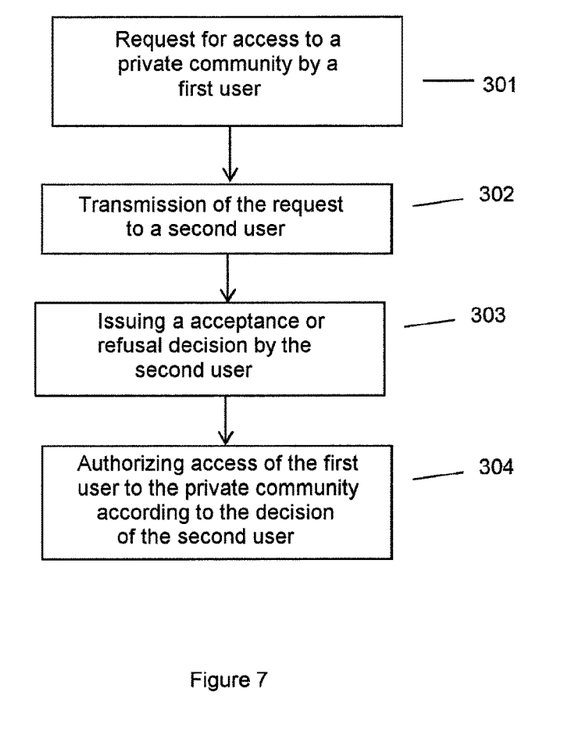
FIG. 7 is a schematic illustration of an embodiment of access by a user to a private community.

An embodiment of a request from a user 13 for access to a private community 20 is described with reference to FIGS. 1 and 7.

A first user 13₁ requests (step 301) via the communication device 1, access to a private community 20 proposing at least one service and/or the exchange of data between users of this community, said private community being managed by a second user $13_2$.

The request of the first user $13_1$ is transmitted (step 302) via the server 8 of the service provider 2, to the communication device of the second user $13_2$.

The second user $13_2$ issues an acceptance or refusal decision via his/her communication device 1 (step 303), which is transmitted to the server 8 of the service provider 2.

The first user $13_1$ is authorized (step 304) to access the private community 20 depending on the decision of the second user $13_2$, an acceptance decision causing association of the asymmetrical public key 11 of the second user $13_2$ with the private community 20.

This association consists of storing in the server 8 a copy of the key 11 of the user $13_1$, and of integrating it into the parameters of the community 20.

Thus, when the first user $13_1$ wishes to use the services of the private community 20, and/or the exchange of data with the other users, the service provider 2 recognizes his/her key 11 and authorizes him/her to access these services.

The acceptance mechanism by the second user $13_2$ may assume diverse forms.

In an embodiment, the second user $13_2$ receives a message telling him/her that the first user $13_1$ wishes to join his/her private community 20. The message may be a standard or customized message and written by the first user $13_1$ himself/herself. This message is displayed via the interface of the communication device 1 of the second user $13_2$.

The second user $13_2$ may then issue an acceptance or refusal decision via his/her interface 30.

An embodiment for exchanging data between users of the same public or private community is described with reference to FIG. 8.

This exchange is based on the different embodiments described earlier, of exchanges of data between the communication device and the service provider.

Figure 8:
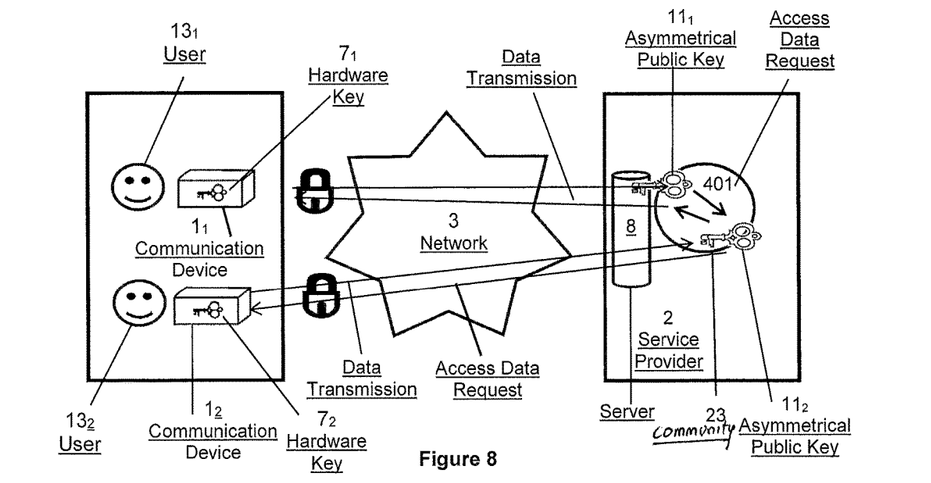
FIG. 8 is a schematic illustration of an embodiment of exchanges between users of a same community.

As illustrated in FIG. 8, a first user $13_1$ is equipped with a first communication device 1 comprising a first hardware key $7_1$.

A second user $13_2$ is equipped with a second communication device $1_2$ comprising a second hardware key $7_2$.

Both users $13_1$ and $13_2$ are members of a same community 23 (either public or private). Thus, as explained earlier, the asymmetrical public key $11_1$ of the first user $13_1$, and the asymmetrical public key $11_2$ of the second user $13_2$ are associated with the community 23.

The first user $13_1$ requests access to data of the second user $13_2$ (step 401).

The server 8 of the access provider 2 requests from the second communication device $1_2$ access to the data of the second user $13_2$ (step 402).

The second communication device $1_2$ transmits these data to the server 8 of the access provider 2, encrypted, at least partly, with the second hardware key $7_2$ (step 403). This encryption and the diverse embodiments for exchanging data were discussed earlier.

The server 8 of the access provider 2 decrypts these data via the second hardware key $7_2$, re-encrypts them with the first hardware key $7_1$ and transmits them to the first communication device $1_1$ (step 404).

The first communication device $1_1$ then decrypts the data with the first hardware key $7_1$.

The exchanges are thus secured. In an embodiment, the exchanged data observe the frame illustrated in FIG. 5, either partly or entirely.

In an embodiment, the exchange of data between the server 8 of the service provider 2 and user-members of a same community, comprises the step according to which a multi-user key 30 common to at least one portion of the users of the community, is used for encrypting the exchanged data.

In an embodiment, the multi-user key 30 is a software key consisting of a succession of bits.

According to an aspect of this embodiment, the sending of data from the server 8 of the service provider 2 to user-members of a same community, said data being identical for the users, comprises the step according to which the server 8 of the service provider 2 sends only once these data to the communications network which sends them back towards each user-member of the same community.

Figure 9:
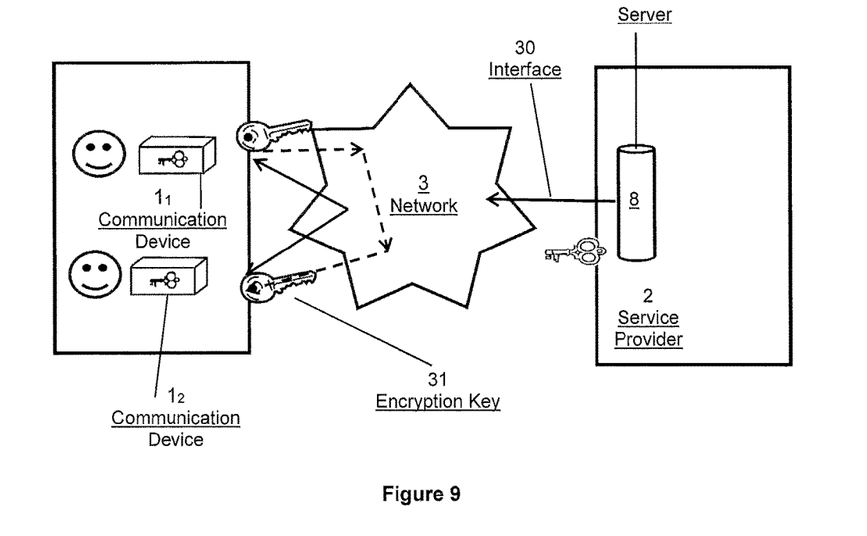
FIG. 9 is a schematic illustration of an embodiment of exchanges between users, and of exchanges between a service provider and the users.

An example of such an embodiment is schematically illustrated in FIG. 9.

The server 8 of the access provider 2 sends to at least one portion of the users of a same community, a multi-user key 30. This key is an encryption key, and is generally of limited validity in time, i.e. this is only a temporary key. Depending on the needs, the server 8 of the service provider may periodically renew the multi-user key 30.

In order to receive the multi-user key 30, the users should register beforehand at the access provider 2. Registration for example requires the sending of a request from the communication devices $1_1$, $1_2$ of the users to the server 8, which receives in return the multi-user key 30.

These exchanges are produced according to the embodiments of secured exchanges of data described earlier (encryption with a hardware key, and if necessary the sending of data in the form of the frame as mentioned earlier). Registration may be automatic. For example as soon as the users access a community, their communication devices automatically receive a multi-user key on behalf of the server 8 of the service provider 2.

The sending of the multi-user key 30 to the communication devices is achieved according to the embodiment of secure exchanges of data described earlier. In particular, the multi-user key 30 may be sent by the server 8 to each communication device while being encrypted with the hardware key of each communication device. Alternatively, the multi-user key 30 may be sent to each communication device by using the successive encryption mechanism described earlier.

Subsequently, the server 8 sends only once the encrypted data with the multi-user key 30 to the communications network 3, which sends them back to the communication devices of the users.

Depending on the size of the data, several successive sendings by the server 8 of the service provider 2 may be necessary, but each sending of data by the service provider to the communications network is only performed once, and not repeated for each user.

The communications network 3 is then responsible for sending the data to each communication device of the users of the community.

The communication devices (here $1_1$ and $1_2$) of the relevant users decrypt the data via the multi-user key 30.

Thus, the sending of a flow of data from the server of the service provider to the communication devices of the users of a community is achieved with less congestion of the bandpass. This single sending of information, encrypted with a key common to several users, gives the possibility of saving bandwidth.

Instead of the service provider sending several times the same data to several users, a single sending is achieved to the communications network. This is therefore a sending of the multicast type. The server 8 no longer has to send data several times by encrypting them differently for each user.

In an embodiment, the server 8 of the service provider 2 sends an encryption key 31 to at least two communication devices (for example $1_1$ and $1_2$, c.f. FIG. 9) of users wishing to exchange data between them. This sending is achieved according to one of the embodiments of the secure exchanges described earlier (encryption with a hardware key, and/or observance of a frame, and/or successive encryption, etc.).

The encryption key is generally temporary. It may be renewed depending on the needs.

The communication devices then exchange data directly between them via the communications network 3, said data being encrypted with the encryption key 31. These exchanges no longer pass through the server 8 of the service provider 2, but are directly achieved between the relevant communication devices, via the communications network 3.

These exchanges may be achieved between a plurality of communication devices, such as for example during videoconferencing with several users.

This is therefore a point-to-point communication which no longer passes through the server 8 of the service provider 2.

The service provider 2 may charge the users for the use of this point-to-point communication service, for example in terms of duration and/or via a lump sum.

In an exemplary embodiment, the exchanged data concern a communication of the voice type over IP.

These direct exchanges between users are therefore secured to a maximum and allow more efficient communication.

Generally, the proposed solution allows increased security of the exchanges of data between the communication device and the service provider. In particular, the attacks from third parties consisting of interposing themselves between the communication device and the service provider are no longer possible.

In addition to making the exchanges more secure, customization and identification of the users of a same communication device are possible thereby allowing identification of each user of a communication device, and of the services associated with this user.

In spite of the increased security and customization provided by the invention, the interface for using the communication device, as exhibited to the user, remains simple and intuitive.

The service providers therefore find powerful tools for creating and managing communities of users, proposing one or several services in an efficient and secure way. Further, the communications between different users of different communication devices are secured and more efficient.

Finally, the bandwidth of the service provider is not altered while providing increased quality on a service level.

The invention claimed is:

1. A method for securing communications between a first communication device and a server of a service provider via a communications network, the method comprising:
    associating a particular asymmetrical public key of a first user that is a user of the first communication device with a community that groups users together through the use of asymmetrical public keys, wherein the grouped users of the community exchange data, and the community is managed by the server that receives and distributes the exchanged data between the first user and the (i) community and (ii) other users of the community;
    securing the data exchanged between the first user and the (i) community and (ii) a second user of the grouped users of the community, through the server, by
    encrypting at least a portion of the data with a hardware key, wherein the hardware key is unique to the first communication device, known to the service provider, and stored within the first communication device, and wherein hardware keys unique to other communication devices are known to the service provider, and
    upon receiving the encrypted data, decrypting the encrypted data with the hardware key,
    wherein the data exchanged through the server comprises a unique identifier specific to the first communication device that allows the service provider to identify the first communication device and find the hardware key associated with the first communication device, and
    wherein the data exchanged with respect to the first user comprises the particular asymmetrical public key allowing identification of the first user and specific services to which the first user has access; and
    allowing the first user to exchange the data with the community and at least the second user of the grouped users of the community, by recognition, by the server, of the particular asymmetrical public key associated with the community, such that the first user is allowed to access (i) specific services associated with the community to be provided by the service provider and (ii) content from the second user, wherein the second user is a user of a second communication device.

2. The method of claim 1 further comprising registering the first user with the first communication device by generating the asymmetrical public key specific to the first user.

3. The method of claim 2, wherein the particular asymmetrical public key is encrypted by the hardware key for decryption by the same hardware key known by the service provider.

4. The method of claim 1, wherein the data exchanged through the server of the service provider comprises an encryption key for use in decrypting the exchanged data, wherein the encryption key comprises of a plurality of keys, each of which being successively encrypted by a following key of the plurality of keys, wherein the succession of encrypted keys is encrypted with the hardware key.

5. The method of claim 1, wherein the data exchanged for the first user through the server of the service provider further comprises:
    a service identifier that allows the server to identify a specific service to which the first user has access,
    a piece of information relative to an index used for selecting a key transmitted to the server, and
    a secure communication protocol between the first communication device and the server.

6. The method of claim 1, wherein the community is a public community, wherein the method further comprises transmitting the particular asymmetrical public key to the server, such that the server associates the particular asymmetrical public key with the public community in order to allow the first user access to the public community.

7. The method of claim 1, wherein the community is a private community that is further being managed by the second user of the private community, wherein the method further comprises transmitting a request for the first user to access the private community to the second communication device of the second user, wherein the particular asymmetrical public key of the first user is associated with the private community in response to the second user accepting the request.

8. The method of claim 1, wherein the data exchanged through the server comprises a multi-user key for use in decrypting the exchanged data, wherein the multi-user key is common between (i) the first user and (ii) at least one other user of the grouped users of the community.

9. The method of claim 1, wherein the first user accesses content from the second user by:
   receiving, from the server, an encryption key for use in decrypting encrypted content from the second user; and
   receiving the encrypted content directly from the second user who encrypted the content with the encryption key, such that the encrypted content does not pass through the server.

10. The method of claim 1, wherein the first user is one of a plurality of users of the first communication device and the particular asymmetrical public key is a first asymmetrical public key, wherein the associating further comprises associating a second asymmetrical public key of a third user of the plurality of users of the first communication device with the community, such that the first and third users are allowed to access a same specific service associated with the community based on the first and second asymmetrical public keys, respectively.

11. A first communication device comprising:
   a processor; and
   a non-transitory machine readable medium storing a hardware key known to a service provider and instructions which when executed by the processor, causes the first communication device to securely communicate with a server of the service provider via a communication network by:
   associating a particular asymmetrical public key of a first user that is a user of the first communication device with a community that groups users together through the use of asymmetrical public keys, wherein the grouped users of the community exchange data, and the community is managed by the server that receives and distributes the exchanged data between the first user and the (i) community and (ii) other users of the community;
   securing the data exchanged between the first user and the (i) community and (ii) a second user of the grouped users of the community, through the server of the service provider, by
   encrypting at least a portion of the data with the hardware key, wherein the hardware key is unique to the first communication device and known to the service provider, and wherein hardware keys unique to other communication devices are known to the service provider, and
   upon receiving encrypted data, decrypting the encrypted data with the hardware key,
   wherein the data exchanged through the server comprises a unique identifier specific to the first communication device that allows the service provider to identify the first communication device and find the hardware key associated with the first communication device, and wherein data exchanged with respect to the first user comprises the particular asymmetrical public key allowing identification of the first user and specific services to which the first user has access; and
   allowing the first user to exchange the data with the community and at least the second user of the grouped users of the community, by recognition, by the server, of the particular asymmetrical public key associated with the community, such that the first user is allowed to access (i) specific services associated with the community to be provided by the service provider and (ii) content from the second user, wherein the second user is a user of a second communication device.

12. The first communication device of claim 11, wherein the non-transitory machine readable medium further stores instructions which when executed by the processor causes the first communication device to register the first user with the first communication device by generating the asymmetrical public key specific to the first user.

13. The first communication device of claim 11, wherein the community is a public community, wherein the non-transitory machine readable medium further stores instructions which when executed by the processor causes the first communication device to transmit the particular asymmetrical public key to the server provider, such that the server associates the particular asymmetrical public key with the public community in order to allow the first user access to the public community.

14. The first communication device of claim 11, wherein the community is a private community that is further being managed by the second user of the private community, wherein the non-transitory machine readable medium further stores instructions which when executed by the processor causes the first communication device to transmit a request for the first user to access the private community to the second communication device of the second user, wherein the particular asymmetrical public key of the first user is associated with the private community in response to the second user accepting the request.

15. The first communication device of claim 11, wherein the non-transitory machine readable medium further stores instructions which when executed by the processor causes the first communication device to access content from the second user by:
   receiving, from the server, an encryption key for use in decrypting encrypted content from the second user; and
   receiving the encrypted content directly from the second user who encrypted the content with the encryption key, such that the encrypted content does not pass through the server.

16. The first communication device of claim 11, wherein the first user is one of a plurality of users of the first communication device and the particular asymmetrical public key is a first asymmetrical public key, wherein the non-transitory machine readable medium further stores instructions which when executed by the processor causes the first communication device to associate a second asymmetrical public key of a third user of the plurality of users of the first communication device with the community, such that the first and third users are allowed to access a same specific service associated with the community based on the first and second asymmetrical public keys, respectively.

17. A communication system comprising:
   a server of a service provider for managing a community that groups users together through the use of asymmetrical public keys, such that the grouped users can exchange data;
   a first communication device for (i) associating a particular asymmetrical public key of a first user that is a user of the first communication device with the community, (ii) securing the data exchanged between the first user and the (1) community and (2) a second user of the grouped users of the community, through the server, by encrypting at least a portion of the data with a hardware key, wherein the hardware key is unique to the first communication device, known to the service provider and stored within the first communication device, and wherein hardware keys unique to other communication devices are known to the service provider, and upon receiving encrypted data, decrypting the encrypted data with the hardware key, and (iii) allowing the first user to exchange data with the (1) community and (2) at least the second user of the grouped users of the community, by recognition, by the server, of the particular asymmetrical public key associated with the community, such that the first user is allowed to access specific services associated with the community to be provided by the service provider and content from the second user; and a second communication device for exchanging the data between the second user that is a user of the second communication device and the first user through the server of the service provider, wherein the server manages the community by receiving and distributing the exchanged data between the first user and the (i) community and (ii) users of the community, and wherein the data exchanged through the server comprises a unique identifier specific to the first communication device that allows the service provider to identify the first communication device and find the hardware key associated with the first communication device, and wherein the data exchanged with respect to the first user comprises the particular asymmetrical public key allowing identification of the first user and specific services to which the first user has access.

18. The communication system of claim 17, wherein the hardware key is a first hardware key and the second communication device comprises a second hardware key, wherein the server manages the community by (i) relaying a request received from the first communication device to access content of the second user to the second communication device, (ii) receiving from the second communication device the requested content that is encrypted at least partly with the second hardware key, (iii) decrypting the content with the second hardware key that is known to the server, (iv) re-encrypting the content with the first hardware key, and (v) transmitting the re-encrypted content to the first communication device, such that the first communication device may decrypt the re-encrypted content with the first hardware key.

19. The communication system of claim 17, wherein the first and second communication devices are each configured to receive a common multi-user key for use in decrypting data received from the server.

20. The communication system of claim 18, wherein the data received at the first and second communication devices encrypted with the multi-user key is a same data, and wherein the server is configured to transmit the same data, to the first and second communication devices only once.

\* \* \* \* \*